(12) United States Patent
Zimmermann et al.

(10) Patent No.: US 6,666,630 B2
(45) Date of Patent: Dec. 23, 2003

(54) MILLING MACHINE AND MILLING PROCESS

(75) Inventors: Michael Zimmermann, Ulm (DE); Jens Boehm, Blaustein (DE); Ralf Herold, Ulm (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 10/171,111

(22) Filed: Jun. 13, 2002

(65) Prior Publication Data

US 2003/0059268 A1 Mar. 27, 2003

(30) Foreign Application Priority Data

Jun. 13, 2001 (DE) .......................... 101 28 536

(51) Int. Cl.⁷ .............................. B23C 1/06; B23C 1/14; B23C 3/04; B23C 9/00
(52) U.S. Cl. ..................... 409/132; 409/135; 409/165; 409/166; 409/168; 219/121.85; 219/121.6; 219/121.66; 219/121.78; 219/121.65
(58) Field of Search ................. 409/131–132, 409/135, 136, 165, 166, 168; 219/121.6, 121.65, 121.66, 121.78, 121.79, 121.85

(56) References Cited

U.S. PATENT DOCUMENTS

| | | | | |
|---|---|---|---|---|
| 2,600,453 A | * | 6/1952 | Weingart ..................... 29/33 R |
| 2,654,821 A | * | 10/1953 | Gillett ..................... 219/69.17 |
| RE25,105 E | * | 12/1961 | Cargill, Jr. ............... 219/69.17 |
| 4,170,726 A | * | 10/1979 | Okuda ................... 219/121.66 |
| 4,229,640 A | * | 10/1980 | Castellani Longo ........ 409/136 |
| 4,352,973 A | * | 10/1982 | Chase .................... 219/121.68 |
| 4,356,376 A | * | 10/1982 | Komanduri et al. ... 219/121.67 |
| 4,459,458 A | * | 7/1984 | Vetsch et al. ............ 219/121.6 |
| 4,733,049 A | * | 3/1988 | Lemelson ............... 219/121.65 |
| 4,934,881 A | * | 6/1990 | Tsujimura et al. ............ 407/42 |
| 4,980,534 A | * | 12/1990 | Okamoto et al. ........ 219/121.6 |
| 5,174,586 A | * | 12/1992 | Saeda et al. ................ 409/221 |
| 5,253,443 A | * | 10/1993 | Baikrich ...................... 42/115 |
| 5,409,376 A | * | 4/1995 | Murphy ........................ 433/29 |
| 5,525,776 A | * | 6/1996 | Okamoto ............... 219/121.68 |
| 5,566,437 A | * | 10/1996 | Jaeggi ......................... 29/33 R |
| 5,859,405 A | * | 1/1999 | Golz et al. ............... 219/121.6 |
| 5,906,459 A | | 5/1999 | Thomas et al. |
| 6,122,824 A | * | 9/2000 | Jensen ...................... 409/132 |
| 6,393,687 B1 | * | 5/2002 | Friedrich ............... 219/121.67 |
| 6,465,756 B2 | * | 10/2002 | Tanaka et al. ........... 219/121.6 |
| 6,476,347 B1 | * | 11/2002 | Whittenbury .......... 219/121.67 |
| 6,575,812 B2 | * | 6/2003 | Wirz .............................. 451/9 |

FOREIGN PATENT DOCUMENTS

| | | | |
|---|---|---|---|
| DE | 3404869 A1 | * | 8/1985 |
| DE | 3922463 A1 | * | 1/1990 |
| DE | 4113633 A1 | * | 10/1992 |
| DE | 199 10 880 A1 | | 9/2000 |
| JP | 61-152345 A | * | 7/1986 |
| JP | 7-1293 A | * | 1/1995 |
| JP | 2001-150256 A | * | 6/2001 |

* cited by examiner

*Primary Examiner*—A. L. Wellington
*Assistant Examiner*—Erica E Cadugan
(74) *Attorney, Agent, or Firm*—Pendorf & Cutliff

(57) ABSTRACT

The invention concerns a 3D milling machine and a 3D milling process. The milling machine comprises a milling unit (2) with a motor driven work spindle (4) for receiving a milling tool, a work table for clamping work pieces, guide and drive device for producing relative movement of the milling unit and the work table in at least three spatial directions, and a laser device (12) for emitting a laser beam. A laser assisted milling of free-form surfaces is made possible in that the milling unit is a spherical cutter (6), further, that a mounting device (30, 32) and a driving device (36, 38) are provided for producing a precise movement of the laser emitter (12) about a point on the beam axis, such that the laser beam (14) circles about a central axis, which intersects the axis of the work spindle (4) at an acute angle, as well as a mounting device and a driving device for at least one of pivoting and rotating of the work table (18) about at least one axis.

7 Claims, 4 Drawing Sheets

A-A

MILLING MACHINE AND MILLING PROCESS

BACKGROUND OF THE INVENTION

1. Field of the Invention

The invention concerns a 3D milling machine and a 3D milling process.

2. Description of the Related Art

A 3D milling machine includes milling unit with a motor driven spindle for receiving a milling tool, a work table for clamping or setting work pieces, and guide elements and drive means for producing relative movement of the milling unit and the work table in three spatial directions. From DE 199 10 880 A1 such a milling machine is known, which additionally includes a laser device for emitting a laser beam, which makes possible a processing of the work piece via the laser beam as an alternative to the milling process.

Special materials such as for example ceramic or certain types of steel are preferably milled with laser assistance. Therein the laser beam locally heats the work piece, in order to bring the cutting zone to a temperature at which the material is more easily removed by cutting or turning, in particular with higher cutting speeds. Various processes for laser-assisted milling are described in U.S. Pat. No. 5,906,459.

Free form surfaces are normally milled using a spherical cutter, as described for example in DE 39 22 463 A1. With hard special materials a milling of free form surfaces is however not possible, only diamond cutting, wherein however the metal removal by cutting is of very small volume.

SUMMARY OF THE INVENTION

The invention makes possible a milling process of free form surfaces with laser assistance.

In the processing of free form surfaces using a spherical cutter, changes in direction continuously occur. Since the laser device is so positioned in the inventive milling machine, that it can carry out a precise movement about a point on the beam axis, in which the spherical cutter is located, one can achieve with a simple mechanical movement of the laser device, that the laser "burn spot" (heated area) precedes the spherical cutter mill by a certain lead separation, in order to heat the entire cross-section being removed by metal cutting. During a change in direction the laser burn spot follows a part of a circle or elliptical track about the spherical cutter. Therein the rotatable or, as the case may be, pivotable work table makes it possible to keep constant the angle of incidence of the spherical cutter to the work piece outer surface at the actual processing point, in at least one plane, such that optimal engagement conditions always exist at the milling cutting site and therewith a large-as-possible rate of advance can be selected.

Preferably, the laser device is mounted cardanically at a point along the beam axis, that is, in a rotatable U-mount or hanger, and mounted eccentrically at a point on the beam axis at a distance therefrom, in particular in an eccentric subassembly, which makes possible an adjustment of the amplitude of the precise movement.

The laser device is preferably mounted to the milling spindle head with which the work spindle is associated. An adjustable mounting makes possible a rapid adaptation to various miller lengths and miller diameters.

A suitable light source could in principle be integrated in the laser device, however in a preferred embodiment a separate light source is envisioned, which is connected with a laser emitter or optic via a flexible light guide, thereby forming the moveable laser device of the milling machine.

Since the laser beam should not be permitted to rest upon the spherical cutter, the movement of the laser burn spot is limited to a semi-circle or, as the case may be, half ellipse about the spherical cutter essentially (based upon the angle between the laser beam axis and axis of the work spindle the laser burn spot on the construction component as a rule does not follow a semi-circle, but rather an elliptical track). Thus initially a key milling line should be carried out as milling type or strategy, in which the direction of milling does not change more than 180°. Within certain limitations, other milling strategies are also possible.

BRIEF DESCRIPTION OF THE DRAWINGS

Further characteristics and advantages of the invention can be seen from the following description of an embodiment on the basis of the drawing. Therein there is shown.

DETAILED DESCRIPTION OF THE INVENTION

Figure 1:
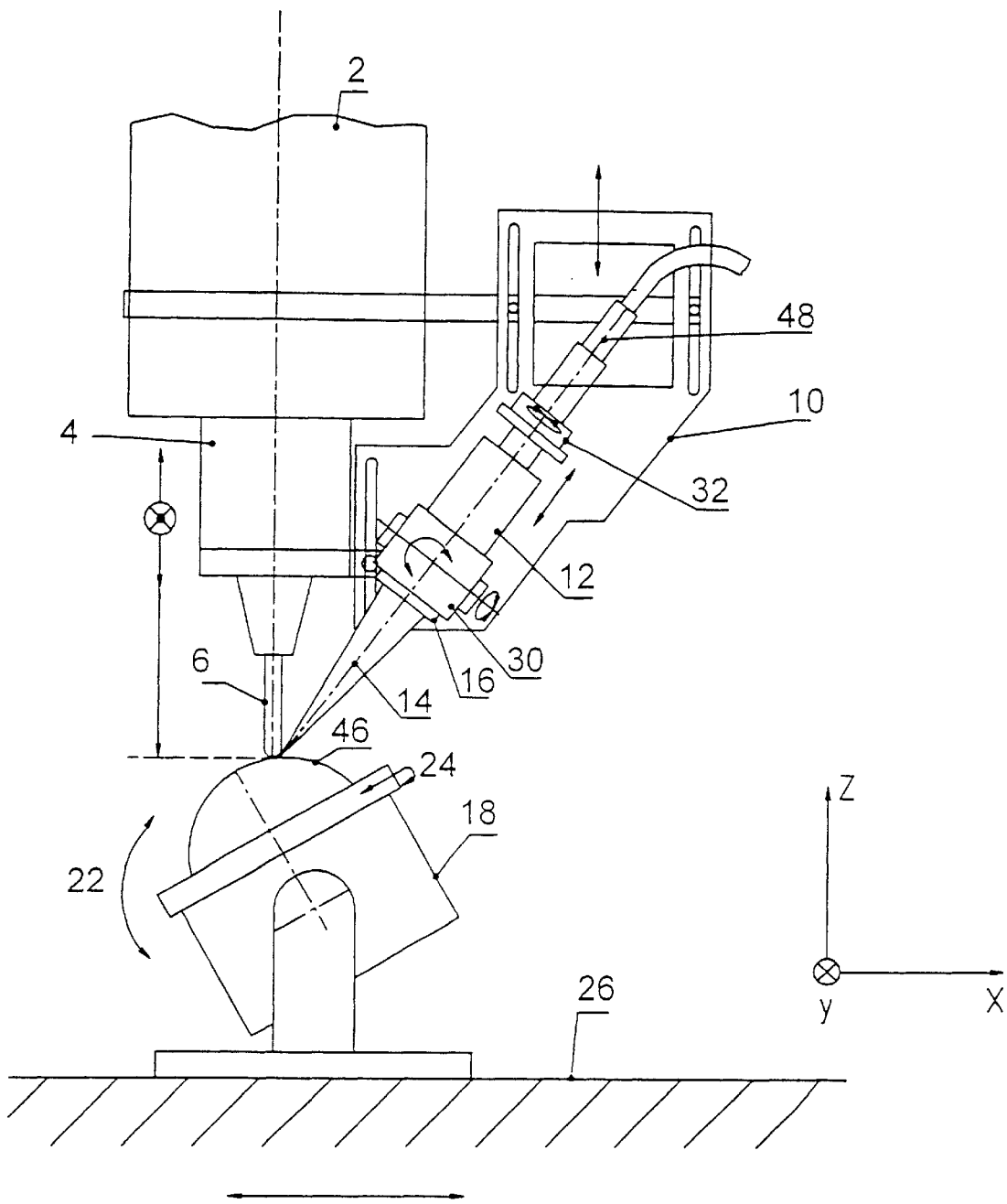
FIG. 1 a view of a milling spindle head with a laser assembly mounted thereon and a rotatable and pivotable work table with work piece, FIG. 2 a section of FIG. 1 in working or processing direction for clarification of the possibilities of movement, FIGS. 3a and 3b respectively one view of the laser assembly in longitudinal and cross direction.

FIG. 1 shows a milling spindle head 2 of a 3D milling machine seen from the front, in particular a portal or gantry milling machine, as known from DE 34 04 869 A1 and of which the detailed description is herein incorporated by reference. Such a milling machine includes in general a milling unit with a motor driven work spindle 4 for receiving a milling work piece, a work table 18 for clamping of work pieces, and guide and drive means for producing relative movement of the milling unit and the work table in three spatial directions.

Figure 2:
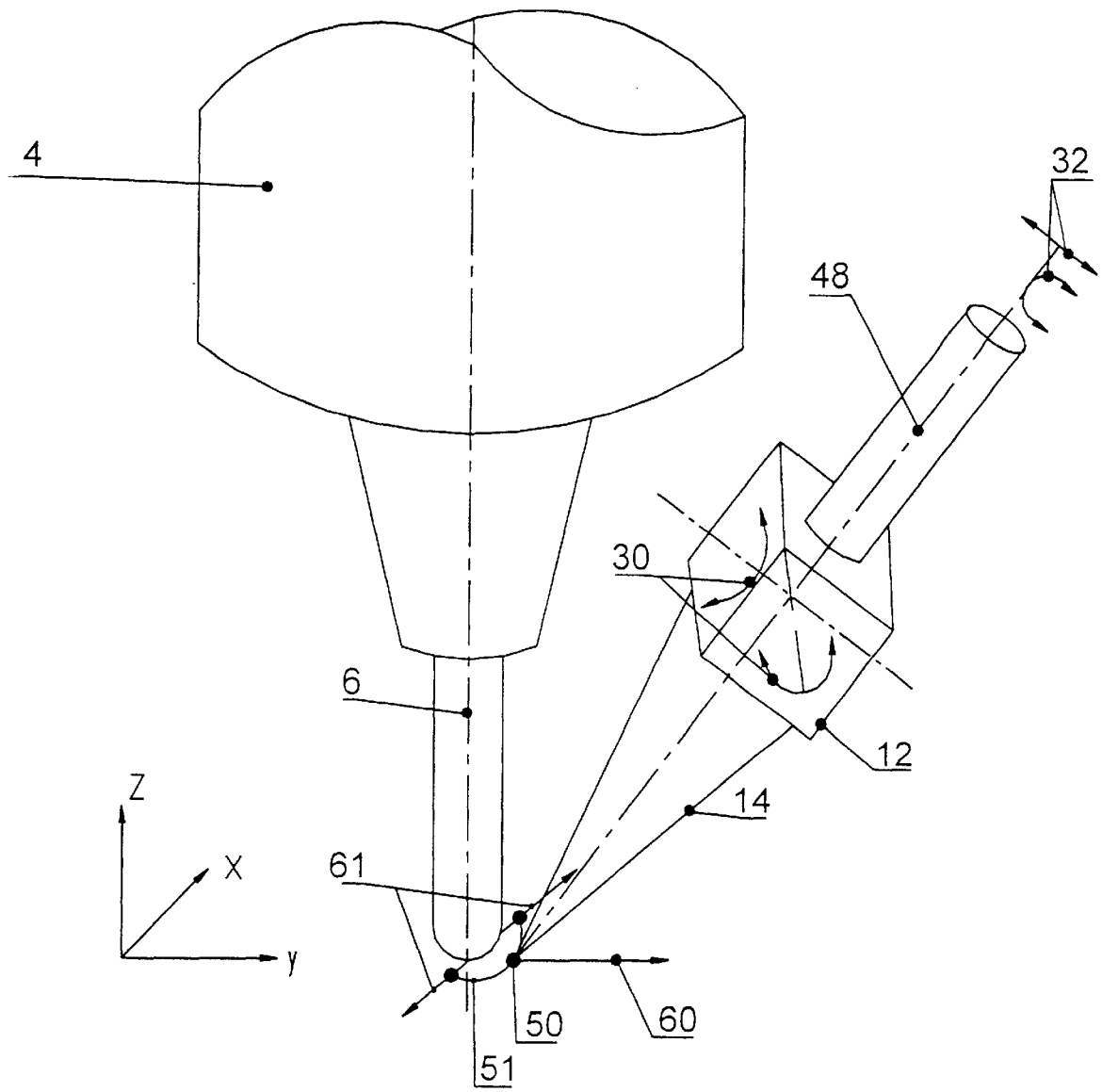

In the milling spindle head 2, which forms the milling unit, there is centrally mounted a working spindle 4, of which the axis extends vertically in FIGS. 1 and 2. The work spindle 4 is driven for rotational about its axis by a motor—not shown in the figures—and includes an axial chuck or bore for receiving different work tools, for example a spherical cutter 6 (FIGS. 1 and 2).

Figure 3A:
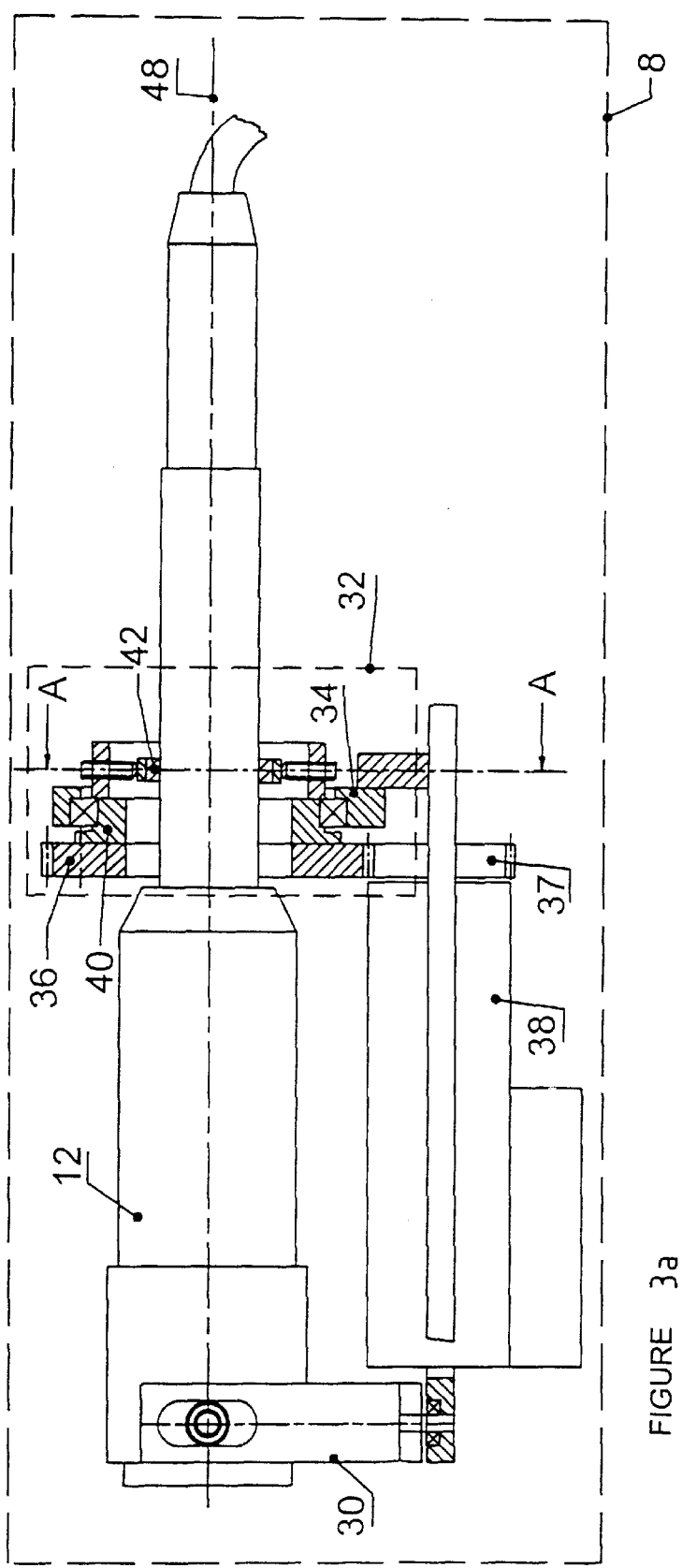
Figure 3B:
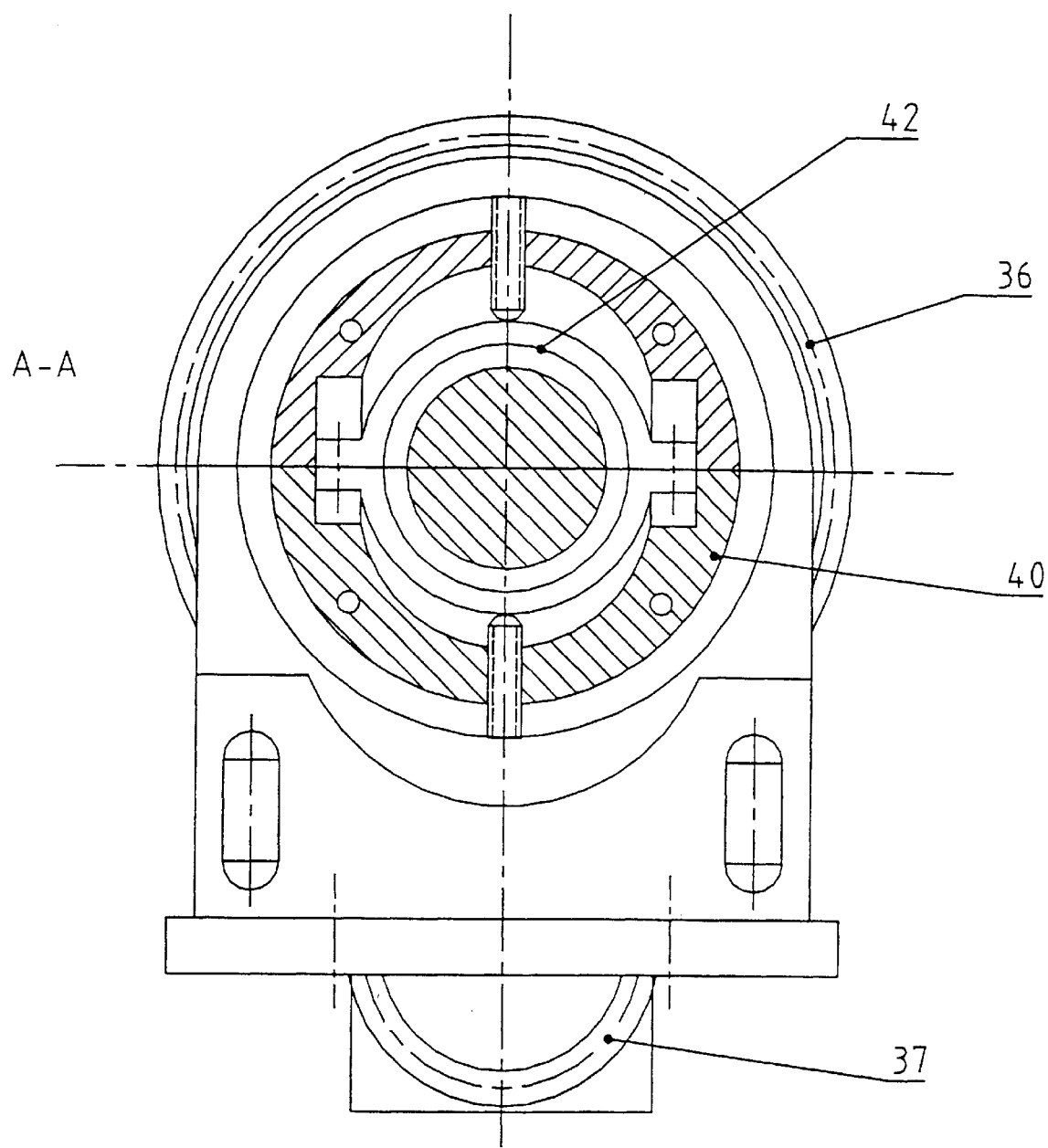

On the side of the milling spindle head 2 there is a laser assembly 8 (FIGS. 3a and 3b). The laser assembly 8 is provided in a mount or chassis 10, which includes a laser device in the form of a laser emitter 12, which receives laser light via a not shown flexible light guide from an external laser light source and produces a coherent laser beam 14, which passes through a protective glass 16 and impinges in an area below the work spindle head 4, impinging in an area near to which the head of the spherical cutter 6 is located during operation.

At its front end facing the protective glass 16 the laser optic 12 is mounted in a cardanic mount 30. At its rearward end, at which it receives laser light, the laser emitter 12 is mounted in an eccentricity subassembly 32, which makes possible a precise movement of the laser emitter 12 about the forward cardanic mount 30. Thereby the laser beam 14 circles or arcs about a center axis with a precise movement, which circle or arc intersects the axis of the work spindle 4 at the location of the head of the spherical cutter 6 at an acute angle of approximately 40°. This serves for compensating or equalizing directional changes or, as the case may be, wandering of the contact point at the circumference of the spherical cutter 6 at constant set angles to the construction component surface in both or, as the case may be, at least one plane.

The laser assembly 8 is secured to the milling spindle head 2 so as to be vertically adjustable, in order to fit or adjust the separation between the work spindle 4 and the burn spot of the laser beam 14 to the projection length of the spherical cutter 6 as shown with the double ended straight arrow.

The work table 18 serves for clamping a work piece 46, in order to support this during processing with the spherical cutter 6 assisted by the laser beam 14.

While the work table 18 of the commercially available three axis portal milling machines always are oriented at the same angle to the milling machine, the herein described milling machine additionally uses mounts and drive means for rotation and/or pivoting of the work table 18 about at least one axis. As can be seen in FIG. 1, the work table 18 is pivotable by means of a digital servo motor about an axis 22, which axis is perpendicular to the axis of the work spindle 4. In addition the work table 18 is rotatable about an axis 24, which extends parallel to the axis of the work spindle 4, whereby the rotation can be motorized—for example carried out on a machine table 26—which carries or incorporates the above described pivot subassembly.

The laser assembly 8 is now described detail on the basis of FIGS. 3a and 3b. The laser emitter 12 has a cylindrical (or quadrilateral) shaped housing, which for the above mentioned cardanic suspension is mounted rotatable in the arms of a U-shaped mount or hanger 30, which for its part is mounted rotatably at its base. At its other end the laser emitter 12 is mounted in the eccentricity subassembly 32, which includes a mounting plate 34, to which a gear 36 is rotatably mounted. The gear 36 has a central hole through which the laser emitter 12 extends. The gear 36 is rotatable about an axis by means of a drive motor 38 and a drive gear 37. On the opposite side of the securing plate 34 there is, within an outer ring 40 connected with the gear 36, a pendulum slide mount 42, of which its eccentricity with respect to the outer ring 40 is adjustable to a maximal value of for example 10 mm. The pendulum slide mount 42 form-fittingly surrounds the housing of the laser emitter 12 and is rigidly connected therewith.

There exists the possibility of aligning the laser subassembly 8 in the longitudinal direction for adjusting the work spacing between the protective glass 16 and the work piece surface (for example ±30 mm) as well as for orientation of the axis of the laser beam 14 to the axis of the work spindle 4 (for example alignment range −7 to +10 mm at the front end of the laser emitter 12).

The laser assembly 8 further includes a CCD-camera, via which the work piece 46 is imaged on a monitor in the vicinity of the work site.

When the drive motor 38 is driven, the axis of the laser emitter 12 circles in the area of the eccentricity assembly 32 at a distance of a few millimeters (corresponding to the adjusted eccentricity) about a center axis 48 of the laser assembly 8, which laser assembly 8 is directed towards the head of the spherical cutter 6. Since the laser emitter 12 is mounted on its other end in a cardanic mount 30, it describes thereby a precise movement about the center axis 48. Accordingly the laser beam 14 describes at the site of the work piece 46 situated on the work table 18 a circular track about the center axis 48. When the just processed surface on the work piece 46 is planar and runs parallel to the work table 18, the laser burn spot of the laser beam 14 describes an elliptical track on the work piece 46, when the drive motor 38 is driven, whereby the movement tolerance is limited to approximately one half ellipse, in order to prevent that the laser beam 14 can impinge on the shaft of the spherical cutter 6.

The eccentricity of the eccentricity assembly 32 is so adjusted, that the average radius of the circular track corresponds to the radius of the spherical cutter inclusive of the radius of the laser burn spot, whereby depending upon tilting of the construction component a certain separation of the burn spot to the milling cross-section results. This separation should in general be as small as possible, it is however limited by the head diameter of the spherical cutter 6.

During milling the work piece 46 continuously moves along under the spherical cutter 6, and the gear 36 is respectively rotated in a position, in which the laser burn spot 50 falls on a site on the work piece 46, which in the following instant is to be processed by the spherical cutter 6. If the direction of processing changes, the laser burn spot 50 must be appropriately timely advanced: FIG. 2 shows the movement path 51 of the laser burn spot 50 in relation to the advancing movement of the spherical cutter 6 in the Y-direction 60 and X-direction 61, wherein the laser burn spot 50 advances in front of the processing site by a few millimeters and thereby warms the entire metal-removing or turning cross-section.

With the described device changes in milling direction of up to 180° can be accommodated. Thus, key millings are employed as milling strategy. Thereby, milling tracks result on the free-form surfaces of the work piece, which when observed from above have the appearance of being straight.

With other strategies for milling of 3D geometries such as high line milling or equidistant milling, there occur normally direction changes of up to 360°, whereby milling tracks appear on the construction component as closed contours. Since the compensation of changes in milling direction during the described process is limited to 180°, such alternative milling strategies can be accomplished only with compromises or limitations.

The work piece 46 is pivoted or, as the case may be, rotated (about the axis 22 or, as the case may be, 24, see FIG. 1) during the course of the processing, in order to maintain the blade or setting angle of the spherical cutter 6 to the work piece surface constant. For maintaining an almost constant separation of the laser burn spot 50 to the material removal cross-section in the direction of advancement of the work piece it can be sufficient to keep the angle of incidence constant only in the direction of advancement. A constant angle of incidence in two planes can have further advantages for the milling process. With a rotatable and pivotable work table 18 there must then be controlled, besides three axis of the 3D milling machine, two further axis of the rotatable or, as the case may be, pivotable work table 18, and there results a five axis milling. Besides this, the circular or, as the case may be, elliptical shaped movement of the laser burn spot 50 must be controlled via the drive motor 38 around about the processing site. This thus requires that the machine control must interpolate six axis, and that the CAD/CAM system generates the corresponding NC-program with suitable or adapted milling strategy.

If the work table 18 is pivotable only about one axis, that is in the case of a four axis milling, then the angle of incidence can be kept constant only for the direction of advance, wherein during the processing of free form surfaces the cutting cross-section moves along the cut edge or blade of the spherical cutter 6. Also in this case, a guiding or following of the laser burn spot 50 is possible with the described device, so that the material removing cross-section can be warmed optimally by the laser beam 14.

In the variant with the five-axis milling, using probe or sample milling, there results with a constant angle of incidence of the spherical cutter 6 to the work piece upper surface depending upon the work piece geometry a rotation movement of the rotation axis, which is associated with a change in the milling direction (from the perspective of the machine coordinates). The necessary movement of the laser burn spot about the radius of the spherical cutter 6 for positioning the laser burn spot in the direction of milling and the directly therewith associated linear relationship of the rotation movement of the eccentricity assembly 32 corresponds just to this rotation angle of the rotation axis of the rotatable and pivotable work table 18. There is thus a linear relationship between these rotation movements, which is associated with a multiplication factor ($\leq 1$), which again depends upon the angle of tilt of the laser emitter 12 to the axis of the work spindle 4 or, as the case may be, to the normal (vertical) of the work piece surface. With the aid of this relationship the machine control can directly calculated, according to which manner the drive motor 38 must be controlled, in order to position the laser burn spot 50 always in the correct position.

A further improvement in the processing possibilities results when the milling unit is provided rotatable about the axis of the work spindle (4).

What is claimed is:

1. Milling machine with:
    a milling unit with a motor driven work spindle for receiving a milling tool;
    a work table for clamping workpieces;
    guide and drive means for producing relative movement of the milling unit and the work table in at least three spatial directions; and
    a laser emitter for emitting a laser beam;
    wherein the milling tool is a spherical cutter (6);
    wherein mounting means (30, 32) and drive means (36, 38) are provided for producing a precise movement of the laser emitter (12) about an axis substantially parallel to the beam, whereby the laser beam (14) circles about the axis (48), which beam intersects a longitudinal axis of the work spindle (4) at an acute angle, and
    drive means for producing at least one of pivoting and rotating movement of the work table (18) about at least one axis.

2. Milling machine according to claim 1, wherein the laser emitter (12) is mounted cardanically (30) at one position along the beam axis.

3. Milling machine according to claim 1, wherein the mounting means (30, 32) and drive means (36, 38) for the precise movement of the laser emitter (12) are adapted for adjusting the amplitude of the precise movement within a predetermined range.

4. Milling machine according to claim 1, wherein the milling tool is rotatable about the longitudinal axis of the work spindle (4).

5. Milling machine according to claim 1, wherein the laser emitter (12) is connected to a milling spindle head (2), to which the work spindle is mounted.

6. Milling machine according to claim 1, wherein the laser emitter is connected to a laser light source via a light guide.

7. Process for milling a work piece,
    in which the work piece and a rotating milling tool move relative to each other in three spatial directions,
    wherein the milling tool is a spherical cutter (6),
    wherein a laser device (12) directs a laser beam (14) at the position on the workpiece which is about to be processed as the spherical cutter (6) advances,
    that the laser beam describes a precise movement about an axis substantially parallel to the beam in order to accommodate for changes in relative direction of milling during processing of the work piece,
    allowing pivoting or rotation of the work piece, in order to keep the angle of incidence of the spherical cutter relative to the work piece constant in at least one plane during processing of the work piece.

* * * * *